United States Patent [19]
Priddy et al.

[11] Patent Number: 5,962,605
[45] Date of Patent: Oct. 5, 1999

[54] HIGH MOLECULAR WEIGHT POLYSTYRENE PRODUCTION BY VINYL ACID CATALYZED FREE RADICAL POLYMERIZATION

[75] Inventors: Duane B. Priddy, Midland; Virginia A. Dais, Sanford, both of Mich.

[73] Assignee: The Dow Chemical Company, Midland, Mich.

[21] Appl. No.: 08/806,764

[22] Filed: Feb. 26, 1997

Related U.S. Application Data

[62] Division of application No. 08/606,182, Feb. 23, 1996, which is a continuation of application No. 08/459,007, Jun. 2, 1995, abandoned, which is a continuation-in-part of application No. 08/355,716, Dec. 14, 1994, abandoned.

[51] Int. Cl.$^6$ ...................................................... C08F 2/02
[52] U.S. Cl. .................................. 526/75; 526/86; 526/87
[58] Field of Search .................................. 526/75, 86, 87, 526/278, 287, 291; 525/255, 261

[56] References Cited

U.S. PATENT DOCUMENTS

| 4,367,320 | 1/1983 | Murray | 526/75 |
| 5,068,255 | 11/1991 | Harris | 526/87 |

*Primary Examiner*—Christopher Henderson

[57] ABSTRACT

The present invention is a free radical bulk polymerization process for the preparation of high molecular weight polymers from vinyl aromatic monomers, characterized in that the polymerization is conducted in the presence of a vinyl acid containing either a sulfur or phosphorus atom within the acid functional group.

15 Claims, 3 Drawing Sheets

GPC curve of final polymer of
Run 5 showing high Mw shoulder

Bimodal GPC curve of polystyrene made in three stage continuous process

GPC Retention Time (min)

GPC Retention Time (min)

GPC Retention Time (min.)

5,962,605

HIGH MOLECULAR WEIGHT POLYSTYRENE PRODUCTION BY VINYL ACID CATALYZED FREE RADICAL POLYMERIZATION

CROSS-REFERENCE TO RELATED APPLICATIONS

This is a divisional of application Ser. No. 08/606,182 filed Feb. 23, 1996, now pending before the U.S. Patent and Trademark Office, which is a continuation of application Ser. No. 08/459,007, filed Jun. 2, 1995, now abandoned, which is a continuation-in-part of application Ser. No. 08/355,716, filed Dec. 14, 1994, now abandoned.

The present invention relates to an improved free radical bulk polymerization process for producing high molecular weight polymers from vinyl aromatic monomers and to a process of producing bimodal compositions containing these high molecular weight polymers.

BACKGROUND OF THE INVENTION

High molecular weight vinyl aromatic polymers, particularly polymers having weight average molecular weights (Mw) of greater than 300,000, have been typically produced by anionic polymerization rather than by free radical polymerization due to the slow polymerization rates used in free radical techniques to achieve high molecular weight polymers. However, anionic polymerization processes require expensive anionic initiators, such as organolithium compounds, and tend to produce discolored products due to the presence of residual lithium-containing salts.

High molecular weight vinyl aromatic polymers have also been produced by free radical polymerization in the presence of a soluble organic acid having pKa of 0.5 to 2.5, as in U.S. Pat. No. 5,145,924. However, in this process the acid does not bind to the polymer and can migrate from the polymer during use, which can cause corrosion of mold surfaces.

It is also known to produce bimodal compositions containing high molecular weight monovinylidene aromatic polymers having Mw of about 400,000 to about 1,900,000 and intermediate molecular weight monovinylidene aromatic polymers having Mw of about 100,000 to about 240,000. These compositions have good combinations of strength, heat resistance and melt flow properties as described in U.S. Pat. No. 4,585,825. However, the high molecular weight polymer of this composition is produced at low temperatures and low conversion rates which require very long reaction times, such as 26 hours at 90° C. to produce 800,000 Mw polystyrene.

Accordingly, it remains highly desirable to produce high molecular weight polymers from vinyl aromatic monomers using a free radical polymerization process which does not exhibit the foregoing disadvantages, as well as to provide an improved process to produce bimodal compositions containing these high molecular weight polymers.

SUMMARY OF THE INVENTION

The first aspect of the present invention is a free radical bulk polymerization process for preparing a high molecular weight polymer from a vinyl aromatic monomer, characterized in that the polymerization is conducted in the presence of a small amount of a sulfur or phosphorus containing vinyl acid. A sulfur or phosporus containing vinyl acid refers to a vinyl acid containing either a sulfur or phosphorus atom within the acid functional group. The vinyl acid catalyzes the polymerization reaction such that high molecular weight polymers are produced in reasonable reaction times. The C—C double bonds of the vinyl acid react with the vinyl aromatic monomer such that the vinyl acid is not free to migrate from the polymer.

The high Mw polymer produced by the process of the present invention can be employed in applications where high molecular weight vinyl aromatic polymers are suitably used, such as foam sheet, films and injection molding processes. They can also be combined with polymers of differing Mw to make polymer compositions having a multimodal molecular weight distribution, preferably a bimodal molecular weight distribution, hereinafter referred to as bimodal compositions.

In another aspect of the present invention, a bimodal composition is produced containing a high molecular weight polymer from the first aspect of the present invention and a lower molecular weight polymer of a vinyl aromatic monomer.

DETAILED DESCRIPTION OF THE INVENTION

Figure 1:
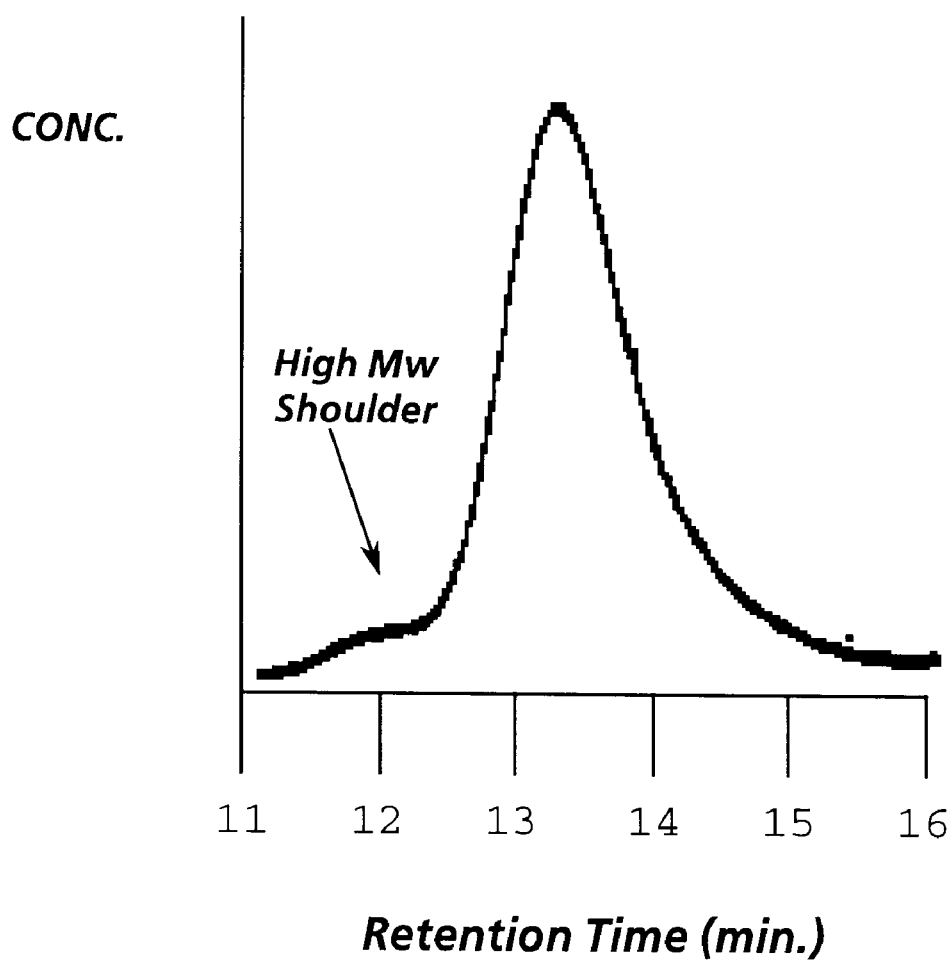
FIG. 1 is a curve obtained by GPC analysis showing the high molecular weight shoulder of Run 5 in Example 3.

Vinyl aromatic monomers for use according to the present invention include, but are not limited to, those vinyl aromatic monomers previously known for use in polymerization processes, such as those exemplified in U.S. Pat. Nos. 4,666,987, 4,572,819 and 4,585,825. Preferably, the monomer is of the formula:

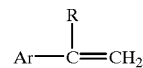

wherein R is hydrogen or methyl, Ar is phenyl, halophenyl, alkylphenyl or alkylhalophenyl, wherein any alkyl group contains 1 to 6 carbon atoms. The term halophenyl refers to a phenyl substituted with one or two halogen atoms, the term alkylphenyl refers to a phenyl substituted with one or two alkyl groups, and the term alkylhalophenyl refers to phenyl substituted with one or two alkyl groups which contain a halogen substituent or to a phenyl substituted with a halogen and an alkyl substituent. More preferably Ar is phenyl or alkylphenyl with phenyl being most preferred. In addition, the polymerization may be conducted in the presence of predissolved elastomer to prepare impact modified, or grafted rubber containing products, examples of which are described in U.S. Pat. Nos. 3,123,655, 3,346,520, 3,639,522, and 4,409,369.

The vinyl acids used in the process of the present invention may be any acid containing either a sulfur or phosphorus atom within the acid functional group such as acids containing $P(=O)(OH)$, $P(=O)(OH)_2$, $P(=O)(OH)O$, $S(=O)(OH)O$ and $S(=O)OH$. Preferably, the vinyl acid is of the formula:

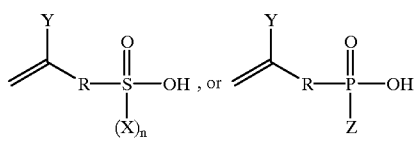

wherein
  X is O and n is either 0 or 1;
  Y is H, methyl or phenyl;
  Z is $C_1$–$C_6$ alkyl, aryl or O—Y; and
  R is —C(=O)$CH_2$CH(Y)—, —C(=O)NH$CH_2$CH(Y)—, phenyl or a direct bond.

Examples of appropriate vinyl acids include but are not limited to 2-sulfoethylmethacrylate (SEM), vinylphosphonic acid (VPA), acrylamidopropanesulfonic acid (AMPS), 2-sulfopropylmethacrylate (SPM), styrenesulfonic acid (SSA), styrenephosphonic acid (SPA), 4-vinylbenzylphoshonic acid (VBPA), 2-sulfoethylacrylate (SEA), α-phenylvinylphosphonic acid (PVPA), 2-methyl-2-phosphonoethyl-2-propenoate, 2-[(2-methyl-1-oxo-2-propenyl)amino]ethyl phosponic acid, 2-[(2-methyl-1-oxo-2-propenyl)amino]ethanesulfonic acid, 2-methyl-2-sulfopropyl- 2-propenoate, and 2-methyl-2-sulfoethyl-2-propenoate, with the most preferred vinyl acid being SEM. These vinyl acids are known and are commercially available or can be made by processes as described in U.S. Pat. No. 4,529,559 which is incorporated herein by reference.

The vinyl acid is present in amounts such that a high molecular weight polymer is produced without appreciably adversely affecting the properties of the polymer. The amount of acid present will depend upon the particular vinyl acid used. Sulfur containing vinyl acids can be used in smaller amounts than phosphorus containing vinyl acids. If the amount of sulfur containing vinyl acid is too great, the acid will initiate cationic polymerization which will produce low molecular weight polymers, e.g. less than 20,000 Mw. Cationic polymerization can therefore be detected by the existance of low molecular weight fractions within the high molecular weight polymer produced. Typically, amounts of from about 10 to about 500 ppm of sulfur containing vinyl acid are present, preferably from about 15 to about 400, more preferably from about 20 to about 300, and most preferably from about 25 to about 200 ppm are present based on the amount of vinyl aromatic monomer. Phosphorus containing vinyl acids may be present in larger amounts and are not known to initiate cationic polymerization. Typically amounts of from about 500 to about 20,000 ppm of phosphorus containing vinyl acid are present, preferably from about 600 to about 15,000 ppm, more preferably from about 800 to about 10,000, and most preferably from about 1000 to about 5000 ppm are present based on the amount of vinyl aromatic monomer.

The polymerization can optionally be conducted in the presence of a nitroxyl stable free radical compound as described in "Narrow Polydispersity Polystyrene by a Free-Radical Polymerization Process-Rate Enhancement", *Macromolecules* 1994, 27, pg. 7228–7229. Typical nitroxyl radical compounds include 2,2,6,6-tetramethyl-1-piperidinyloxy and 3-carboxy-2,2,5,5-tetramethyl-1-pyrrolidinyloxy. Typical amounts of nitroxyl stable free radical are from 10 ppm to 2000 ppm based on the amount of vinyl aromatic monomer.

An initiator may optionally be present in the free radical polymerization. Typical initiators include azo compounds and peroxides. Exemplary peroxides include tert-butylperoxybenzoate, tert-butylperoxyacetate, di-tert-butylperoxide, dibenzoylperoxide, dilauroylperoxide, 1,1-bis-tert-butylperoxycyclohexane, 1,1,-bis -tert-butylperoxy-3,3,5-trimethylcyclohexane and dicumylperoxide.

The polymerization can be conducted at any temperature at which a high molecular weight polymer will be produced. Suitable polymerization temperatures are from about 80° C. to about 170° C., preferably from about 110° C. to about 160° C., with about 115° C. to about 150° C. being the most preferred.

The amount of time needed for the polymerization is dependent upon a number of factors including the acid concentration, the (optional) initiator concentration, the (optional) nitroxyl radical concentration, the percent conversion desired and the reaction temperature. Typically, the polymerization is conducted from 0.5 to 8 hours, preferably from 1 to 6 hours and most preferably from 1 to 5 hours.

The molecular weight of the resulting high molecular weight polymer is dependent upon a number of factors including the temperature, the (optional) initiator concentration, the (optional) nitroxyl radical concentration, the acid concentration and the time of reaction. The term molecular weight (Mw) refers to the weight average molecular weight as determined by gel permeation chromatography. The molecular weight of the high molecular weight polymer formed according to the process of the first aspect of the present invention is typically from about 100,000 to about 450,000, preferably from about 150,000 to about 450,000, more preferably from about 250,000 to about 450,000, and most preferably from about 350,000 to about 450,000. Polymers having molecular weights greater than 450,000 are undesirable because they are difficult to process.

The polymers produced by the first aspect of the present invention can also have the added advantage of a narrow polydispersity. Polydispersity refers to the ratio of the weight average molecular weight to the number average molecular weight. The high molecular weight polymers produced by the first aspect of the present invention typically have polydispersity values of less than 2.5.

The high molecular weight polymers produced according to the process of the first aspect of the present invention may be blended with other ingredients, such as mold release additives, lubricants, colorants, ignition resistant additives, impact modifiers, glass fibers, and other polymers such as polyphenylene oxides, polycarbonates, elastomeric copolymers such as styrene-butadiene block copolymers, polybutadiene, etc., as well as other polyvinylaromatic resins.

The high molecular weight vinyl aromatic polymer produced according to the process of the present invention may be recovered by removing diluent and/or unreacted monomer from the reaction mixture resulting from the polymerization. Alternatively, the reaction mixture can be further processed to produce polymodal compositions containing polymers of differing molecular weight.

In one embodiment, bimodal compositions can be produced as described in U.S. Pat. No. 4,585,825 by Wesselmann, which is incorporated herein by reference. The bimodal composition is made by adding initiator to the high molecular weight polymer/unreacted monomer mixture, and polymerizing the unreacted monomer to produce a relatively low molecular weight vinyl aromatic polymer in the presence of the high molecular weight polymer.

The initiator may be any initiator or mixture of initiators which will polymerize the unreacted monomer in the mixture containing the high molecular weight polymer. The initiator can be any free radical initiator as discussed previously, and is preferably a peroxide initiator such as tert-butylperoxybenzoate, tert-butylperoxyacetate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane and dicumylperoxide. Typical amounts of initiator are from 10 ppm to 2000 ppm based on the amount of vinyl aromatic monomer.

In another embodiment of preparing bimodal compositions, the initiator and vinyl acid can be added to the initial monomer feed prior to the production of high molecular weight polymer. In this process, the initiator is chosen such that lower molecular weight polymer is produced first. Upon depletion of the initiator, further polymerization yields a high molecular weight polymer. The initiator used in this embodiment preferably has a one hour half life temperature of less than 120° C. The one hour half life temperature is the temperature at which one half of the initiator is consumed after one hour of reaction time. Suitable initiators include benzoylperoxide, 1,1-bis(t-butylperoxy)cyclohexane, 2,2-bis-(4,4-di-[t-butylperoxy]cyclohexyl)propane, and t-butylperoxypivalate. Typical amounts of these initiators are from 10 ppm to 2000 ppm based on the amount of vinyl aromatic monomer.

Optionally, chain transfer agents may be utilized in the preparation of the lower molecular weight polymer. Suitable chain transfer agents include common chain transfer agents known in the art such as mercaptans. Preferably, the chain transfer agent is n-dodecylmercaptan or terpinoline. Typical amounts of chain transfer agents are from 10 ppm to 2000 ppm based on the amount of vinyl aromatic monomer.

The desired Mw of the high molecular weight polymer in polymodal compositions will be significantly higher than the desired Mw described in the first aspect of the present invention, since the high Mw polymer will be blended with a lower molecular weight polymer. In this aspect of the present invention the Mw can be selected according to the desired Mw of the polymodal composition and is preferably from about 500,000 to about 2,000,000 more preferably from about 700,000 to about 1,800,000, and most preferably from about 800,000 to about 1,500,000.

The desired Mw of the lower molecular weight polymer is also a matter of choice and is dependent upon the desired Mw of the bimodal composition and the desired properties. Preferably the Mw is from about 50,000 to about 200,000.

The amount of high molecular weight polymer present in the polymodal composition can be selected according to the desired properties of the polymodal composition. Typically, from 1 to 40 percent, preferably from 5 to 35 percent, and most preferably from 10 to 20 percent of the high molecular weight polymer is present.

The average Mw of polymodal compositions is dependent upon the Mw of the polymers contained within the composition. The average Mw of the bimodal composition of this embodiment of the present invention is preferably from about 100,000 to about 600,000, more preferably from about 125,000 to 500,000, and most preferably from about 150,000 to 450,000.

The composition containing both high and lower molecular weight vinyl aromatic polymers may be any combination of two vinyl aromatic polymers but is preferably a blend of polymers having the same composition (i.e., homopolymers of the same monomeric units or copolymers having the same comonomeric units in the similar ratios). More preferably, both polymers are polystyrene.

A preferred process for the production of the bimodal composition is a continuous polymerization process wherein a group of several distinct reaction zones within one or more reactors are used in series to create the different molecular weight polymers. The different zones are maintained at the desired temperatures and supplied with the appropriate reactants necessary to produce the desired amounts of polymer having the specified molecular weights, such that polymodal compositions are produced.

In a preferred process, wherein the high molecular weight polymer is produced first, an earlier polymerization zone is maintained such that the high molecular weight polymer is produced, while a later zone receives the reaction mixture from the previous zone, including the high molecular weight polymer. The later zone is optionally supplied with additional reactants, including an initiator, and is otherwise maintained such that it produces a lower molecular weight polymer in the presence of the previously produced high molecular weight polymer, a blend of the two components being achieved thereby. Usually, the earlier high molecular weight polymer-producing reactor or zone is at a lower temperature than the subsequent lower molecular weight polymer producing reactor or zone.

In another preferred process, wherein the lower molecular weight polymer is produced first, an earlier zone is maintained such that lower molecular weight polymer is produced, while a later zone receives the reaction mixture from the previous zone including the lower molecular weight polymer. The later zone is maintained such that it produces high molecular weight polymer in the presence of the previously produced lower molecular weight polymer, a blend of the two components being achieved thereby. Both zones may be maintained at the same temperature or the later zone may be at a higher temperature than the previous zone.

Bimodal compositions containing high molecular weight and lower molecular weight polymers are useful for a variety of applications including foam board, foam sheet, injection molding, and extrusion.

The following examples are set forth to illustrate the present invention and should not be construed to limit its scope. In the examples, all parts and percentages are by weight unless otherwise indicated. The polymer weight average molecular weight (Mw) is determined using gel permeation chromatography (GPC) and refers to the Mw of the solids. Number average molecular weight (Mn) is also determined using (GPC).

EXAMPLE 1

High Molecular Weight Polystyrene Produced in the Presence of 2-Sulfoethylmethacrylate A mixture of styrene (96 parts) and ethylbenzene (4 parts) is separated into seven pairs of glass tubes. To one pair of tubes is added 500 ppm (based on styrene monomer) camphorsulfonic acid (CSA). To five other pairs of tubes are added 100, 200, 300, 400 and 500 ppm (based on styrene monomer) 2-sulfoethylmethacrylate (SEM), respectively. The tubes are sealed under vacuum and placed into an oil bath at 110° C. One tube from each of the pairs is removed from the bath after 1 hour, and the other tube of each pair after 2 hours. The tubes are opened and the percent styrene polymer is determined gravimetrically by evaporation of unreacted monomer and solvent. The polymer weight average molecular weight (Mw) is determined for each tube using gel permeation chromatography (GPC).

TABLE I

| CSA[1] (ppm) | SEM[2] (ppm) | % PS[3] | Mw/1000 | Time(h) |
|---|---|---|---|---|
| 0 | 0 | 4.9 | 305 | 1 |
| 0 | 0 | 6.8 | 298 | 2 |
| 500 | 0 | 4.4 | 783 | 1 |
| 500 | 0 | 7.4 | 845 | 2 |
| 0 | 100 | 4.1 | 958 | 1 |
| 0 | 100 | 6.9 | 1047 | 2 |
| 0 | 200 | 3.6 | 1031 | 1 |
| 0 | 200 | 6.6 | 980 | 2 |
| 0 | 300 | 3.5 | 1027 | 1 |
| 0 | 300 | 4.7 | 1157 | 2 |
| 0 | 400 | 2.8 | 1084 | 1 |
| 0 | 400 | 4.5 | 1100 | 2 |
| 0 | 500 | 2.8 | 1265 | 1 |
| 0 | 500 | 4.5 | 1245 | 2 |

[1]Camphorsulfonic acid
[2]2-Sulfoethylmethacrylate
[3]Polystyrene

The Mw of polystyrene increases with increasing SEM concentration and is substantially higher than polystyrene with CSA or without acid at all.

EXAMPLE 2

High Molecular Weight Polystyrene Produced in the Presence of SEM and a Nitroxyl Stable Free Radical Runs 1–4 (each run consists of 4 ampoules) are run in the following manner:

The appropriate amounts of 2-sulfoethylmethacrylate (SEM), tert-butylperoxybenzoate (tBPB), and/or 2,2,6,6-tetramethyl-1-piperidinyloxy (TP) as indicated in Table II, are dissolved in 2 g of styrene. The solution is placed in a glass ampoule (5 mm×30 cm) and the ampoule is sealed under vacuum. The ampoule is heated in an oven at 140° C. and an ampoule is removed after 1, 2, 4, and 6 hours as indicated in Table II. At these times, percent conversion, Mw and Mn are determined.

TABLE II

RESULTS OF AMPOULE EXPERIMENT

| Number | SEM (ppm)* | tBPB (ppm)* | TP (ppm)* | Time (hours) | Conv.(%) | Mw/1000 | Mn/1000 |
|---|---|---|---|---|---|---|---|
| 1 | 0 | 1865 | 1500 | 1 | 56.8 | 51 | 35 |
|   |   |      |      | 2 | 72.5 | 59 | 43 |
|   |   |      |      | 4 | 81.7 | 63 | 43 |
|   |   |      |      | 6 | 85.7 | 63 | 41 |
| 2 | 0 | 0 | 1500 | 1 | 8.5 | 19 | 15 |
|   |   |   |      | 2 | 24.1 | 39 | 28 |
|   |   |   |      | 4 | 49 | 57 | 38 |
|   |   |   |      | 6 | 61.6 | 64 | 41 |
| 3 | 100 | 0 | 1500 | 1 | 4.9 | 10 | 9 |
|   |     |   |      | 2 | 26.4 | 41 | 30 |
|   |     |   |      | 4 | 64.9 | 75 | 52 |
|   |     |   |      | 6 | 78.8 | 89 | 57 |
| 4 | 100 | 1865 | 1500 | 1 | 53.8 | 52 | 37 |
|   |     |      |      | 2 | 71.5 | 59 | 42 |
|   |     |      |      | 4 | 85.4 | 69 | 45 |
|   |     |      |      | 6 | 89.3 | 74 | 49 |

*ppm based on amount of styrene monomer
The presence of SEM clearly accelerates the polymerization rate for polymerizations without initiator. However, the polymerizations with initiator were less affected.

EXAMPLE 3

Production of Bimodal Compositions Containing High Molecular Weight Polystyrene

Runs 5, 6 and 7 are performed in the following manner:

Styrene (1200 g) is loaded into a 1500 milliliter (mL) reactor, as described in FIG. 1 of U.S. Pat. No. 4,239,863, with 2-sulfoethylmethacrylate (SEM) as indicated in Table III. The mixture is heated isothermally at 120° C. or 125° C., as indicated in Table III, for 2 hours and a sample collected for styreneconversion and molecular weight analysis. A second solution consisting of initiators and in Run 2, n-dodecylmercaptan, is added at this time and the mixture is gradually heated to 155° C. over 4 hours in a consistent and linear manner. The type and concentration of initiator are indicated in Table III. When the polymerization temperature reaches 155° C., a sample is collected for determination of the polymer content (% solids) and Mw analysis. The data is summarized in Table III.

TABLE III

| Run No. | SEM (ppm) | Temp. (°C.)[1] | Mw before 2nd add[2] | tBPB in 2nd add (% w/w)[3] | DtBP in 2nd add (% w/w)[4] | NDM in 2nd add (% w/w)[5] | % Solids/Mw after 155 °C.[6] |
|---|---|---|---|---|---|---|---|
| 5 | 100 | 120 | 1200000 | 0.5 | 0.5 | 0 | 76/210,000 |
| 6 | 50 | 125 | 1000000 | 0 | 0.3 | 0.8 | 70/284,000 |
| 7 | 25 | 125 | 800000 | 0.4 | 0.4 | 0 | 78/250,000 |

[1] This refers to the temperature of the polymerization in preparing high molecular weight polymer.
[2] This refers to the Mw of the high molecular weight polymer before addition of additional reactants and initiator in order to make lower molecular weight polymer.
[3] This refers to the amount of tert-butylperoxybenzoate, based on the total weight of the composition, added to the high molecular weight polymer composition.
[4] This refers to the amount of di-tert-butylperoxide, based on the total weight of the composition, added to the high molecular weight polymer composition.
[5] This refers to the amount of n-dodecylmercaptan, based on the total weight of the composition, added to the high molecular weight polymer composition.
[6] This refers to the percent solids present after the polymerization temperature has reached 155° C., and the corresponding Mw.

The GPC curves of the products show an unstatistically high level of high molecular weight fractions as evidenced by the shoulder on the high molecular weight side of the GPC curves (see FIG. 1).

EXAMPLE 4

Production of Bimodal Polystyrene 50 ppm SEM (based on styrene monomer) and styrene is pumped into a stirred three tube reactor polymerization system connected in a series arrangement. Each reactor is defined as having three zones and therefore the polymerization system has nine zones as exemplified in Table IV. The temperatures, residence time and other data for each zone are also included in Table IV. A mixture of ethylbenzene (EB) and tBPB is added in zone 5 as shown in Table IV to initiate the polymerization of lower molecular weight polymer. Upon leaving the third reactor, the polymerized mass enters a devolatilization unit to remove the diluent and residual styrene.

TABLE IV

Summary of the miniplant conditions

| Zone # | Res. Time (h) | Poly. Temp Temp. (° C.) | Solids (%) | EB (%) | tBPB (ppm) | Mw/ 1000 | Mn/ 1000 |
|---|---|---|---|---|---|---|---|
| 1 | 0.8 | 120 |  | 0 | 0 |  |  |
| 2 | 0.8 | 120 |  | 0 | 0 |  |  |
| 3 | 0.8 | 120 | 8.4 | 0 | 0 |  |  |
| 4 | 0.8 | 120 |  | 0 | 0 | 1200 | 540 |
| 5 | 0.65 | 120 |  | 20 | 1500 |  |  |
| 6 | 0.65 | 120 | 53 | 20 |  |  |  |
| 7 | 0.65 | 125 |  | 20 |  |  |  |
| 8 | 0.65 | 135 |  | 20 |  |  |  |
| 9 | 0.65 | 145 | 62 | 20 |  | 240 | 60 |

Figure 2:
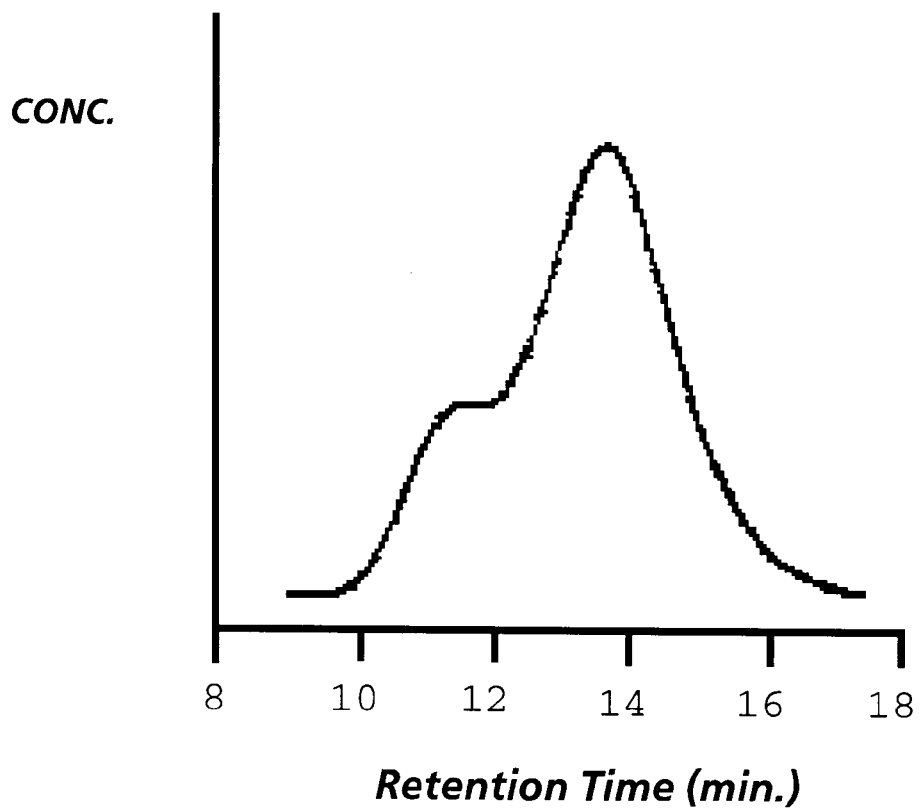
FIG. 2 is a curve obtained by GPC analysis showing the bimodal dispersity of polystyrene produced in the three stage continuous process of Example 4.

The product clearly has a bimodal dispersity (See FIG. 2).

EXAMPLE 5

Figure 3A:
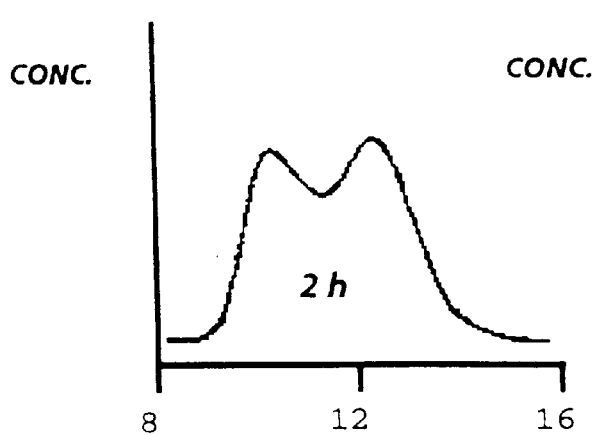
FIG. 3 is a set of three curves obtained by GPC analysis showing the bimodal dispersity of polystyrene produced in Example 5 with both initiator and SEM in the polymer feed after 2 hours, 4 hours and 6 hours of reaction time.
Figure 3B:
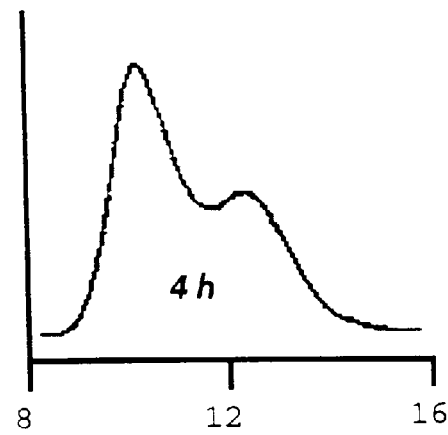
Figure 3:
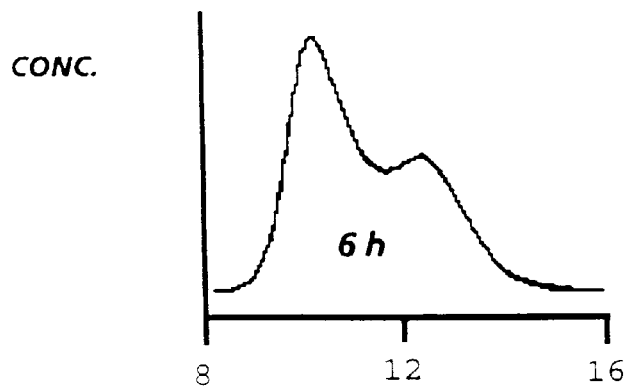

Production of Bimodal Polystyrene With Both Initiator and SEM in the Polymerizer Feed 100 ppm of SEM and 1000 ppm of benzoylperoxide (BPO) (based on the amount of styrene) is dissolved in 2 g of styrene. The solution is placed in three glass ampoules (5 mm ID×30 cm length) and the ampoules sealed under vacuum. The ampoules are heated at 140° C. in an oven. An ampoule is removed from the oven after 2, 4, and 6 hours. The percent styrene conversion and Mw of the polystyrene produced is determined as shown in Table V. The GPC curves show that the polystyrene produced has a bimodal polydispersity (See FIG. 3).

TABLE V

| Polym. Time (hours) | Conversion (percent) | Mw/1000 |
|---|---|---|
| 2 | 38 | 350 |
| 4 | 55 | 540 |
| 6 | 62 | 525 |

What is claimed is:
1. A bulk polymerization process comprising:
   a) partially polymerizing a monomer composition consisting essentially of a vinyl aromatic monomer, in the presence of a free radical initiator under conditions such that a mixture of a low molecular weight polymer and unreacted vinyl aromatic monomer is produced, and
   b) further polymerizing the mixture in the presence of a sulfur or phosphorus containing vinyl acid selected from the formulas:

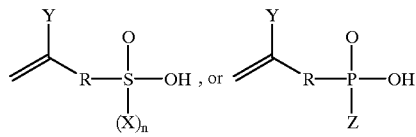

wherein X is O and n is either 0 or 1; Y is H, methyl or phenyl; Z is $C_1$–$C_6$ alkyl, aryl or O—Y; and R is —C(=O)CH$_2$CH(Y)—, —C(=O)NHCH$_2$CH(Y)—, phenyl or a direct bond, and wherein the sulfur containing vinyl acid is present in amounts of from 25 to 200 ppm and the phosphorus containing vinyl acid is present in amounts of from 500 to 20,000 ppm; such that a high Mw polymer is produced.

2. The process of claim 1 wherein the high molecular weight vinyl aromatic polymer and the low molecular weight vinyl aromatic polymer are both polystyrene.

3. The process of claim 2 wherein the high molecular weight polystyrene has a Mw of about 500,000 to about 2,000,000 and the low molecular weight polystyrene has a Mw of about 50,000 to about 200,000.

4. The process of claim 1 wherein the initiator is tert-butylperoxybenzoate, tert-butylperoxyacetate, di-tert-butylperoxide, dibenzoylperoxide, dilauroylperoxide, 1,1-bis-tert-butylperoxycyclohexane, 1,1-bis-tert-butylperoxy-3,3,5-trimethylcyclohexane, 2,2-bis[4,4-(di-t-butylperoxy)-cyclohexyl]propane or dicumylperoxide.

5. The process of claim 1 wherein the low Mw polymer is produced in the presence of a chain transfer agent.

6. The process of claim 5 wherein the chain transfer agent is n-dodecylmercaptan.

7. The process of claim 1 wherein the composition of high molecular weight vinyl aromatic polymer and low molecular weight vinyl aromatic polymer has a Mw of about 100,000 to about 600,000.

8. A bulk polymerization process comprising:
a) partially polymerizing a monomer composition consisting essentially of a vinyl aromatic monomer, in the presence of a sulfur or phosphorus containing vinyl acid selected from the formulas:

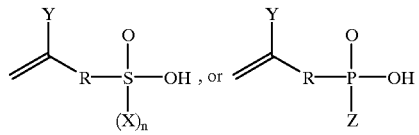

wherein X is O and n is either 0 or 1; Y is H, methyl or phenyl; Z is $C_1$–$C_6$ alkyl, aryl or O—Y; and R is —C(=O)CH$_2$CH(Y)—, —C(=O)NHCH$_2$CH(Y)—, phenyl or a direct bond, and wherein the sulfur containing vinyl acid is present in amounts of from 25 to 200 ppm and the phosphorus containing vinyl acid is present in amounts of from 500 to 20,000 ppm, such that a mixture of a high Mw polymer and unreacted vinyl aromatic monomer is produced, and b) further polymerizing the mixture in the presence of a free radical initiator under conditions such that a low molecular weight polymer is produced.

9. The process of claim 8 wherein the high molecular weight vinyl aromatic polymer and the low molecular weight vinyl aromatic polymer are both polystyrene.

10. The process of claim 9 wherein the high molecular weight polystyrene has a Mw of about 500,000 to about 2,000,000 and the low molecular weight polystyrene has a Mw of about 50,000 to about 200,000.

11. The process of claim 8 wherein the initiator is tert-butylperoxybenzoate, tert-butylperoxyacetate, di-tert-butylperoxide, dibenzoylperoxide, dilauroylperoxide, 1,1-bis-tert-butylperoxycyclohexane, 1,1-bis-tert-butylperoxy-3,3,5-trimethylcyclohexane or dicumylperoxide.

12. The process of claim 8 wherein the low Mw polymer is produced in the presence of a chain transfer agent.

13. The process of claims 12 wherein the chain transfer agent is n-dodecylmercaptan.

14. The process of claim 8 wherein the composition of high molecular weight vinyl aromatic polymer and low molecular weight vinyl aromatic polymer has a Mw of about 100,000 to about 600,000.

15. The process of claims 1 or 8 wherein the vinyl acid is sulfoethylmethacrylate.

* * * * *

UNITED STATES PATENT AND TRADEMARK OFFICE
CERTIFICATE OF CORRECTION

PATENT NO. : 5,962,605
DATED : October 5, 1999
INVENTOR(S) : Duane B. Priddy and Virginia A. Dais It is certified that error appears in the above-identified patent and that said Letters Patent is hereby corrected as shown below:

Claim 1 lines 53-60 and Claim 8 lines 26-33, the formulas should correctly read:

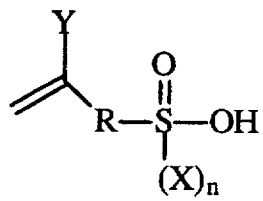   , or   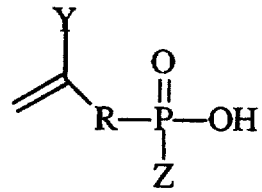

Signed and Sealed this

Seventh Day of August, 2001

*Attest:*

*Attesting Officer*

NICHOLAS P. GODICI
*Acting Director of the United States Patent and Trademark Office*